2

3,494,759
TRIAZINE HERBICIDES

Paul James Mason, Chester, and Harry Edwards Ulmer, Hopewell, Va., assignors to Allied Chemical Corporation, New York, N.Y., a corporation of New York
No Drawing. Filed Sept. 13, 1968, Ser. No. 759,798
Int. Cl. A01m 9/22; C07d 55/22
U.S. Cl. 71—93                                      3 Claims

ABSTRACT OF THE DISCLOSURE

2 - chloro - 4 - alkylamino - 6 - (fluoro-2-hydroxyisopropylamino) - s - triazines are prepared by reacting 2-amino-4-chloro-6-alkylamino-s-triazine with an appropriately fluorinated acetone. The products are useful as herbicides. The compound 2-chloro-4-ethylamino-6-(2-hydroxy-1,1,1,3,3,3,-hexafluoroisopropylamino) - s - triazine is particularly useful because it will selectively destroy weeds in both corn and oat crops, making possible an initial crop of corn immediately followed by an oat crop.

Background of the invention

This invention relates to novel triazine compounds; in particular, it relates to 2-chloro-4-alkylamino-6-(fluoro-2-hydroxyisopropylamino)-s-triazines which are herbicidal agents.

Over the past few years a large number of chemical herbicides have been placed on the market, but despite the increasing number of herbicides there remain problems for which none or few herbicides are appropriate. For example, non-selective herbicides are available which, when used for post-emergence, will produce high kills of all vegetation; selective herbicides are available which will attack dicotyledonous or monocotyledonous plants but which also cause a high percent of crop injury. There are very few compounds available which are so selective that they will attack all forms of vegetation with the exception of one crop and, accordingly, there is a great need in the art for such a herbicide. This need may be shown by the fact that previously, in order to destroy all vegetation except one crop, it was necessary to employ at least two separate herbicides, a method which would make such a procedure economically and commercially impractical.

Summary of the invention

The novel triazines of the instant invention are those of the formula

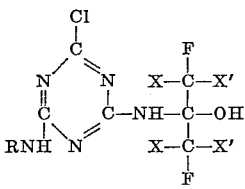

wherein X and X' are each selected from the group consisting of fluorine, chlorine and hydrogen, and R is alkyl containing up to 4 carbon atoms. These compounds are highly selective herbicides.

Detailed description of the invention

The instant substituted triazines are synthesized by reacting 2-amino-4-chloro-6-alkylamino-s-triazine with a fluoroacetone according to the sequence.

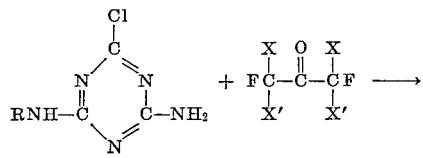

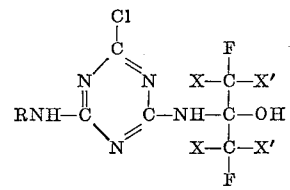

wherein X, X' and R are as aforesaid. An excess of the acetone reagent is preferred for improved yields, although equimolar quantities may be used in the mixture. The reaction is conducted in a reaction-inert solvent such as acetone and the like; preferred solvents include ketones such as acetone.

The reaction mixture is normally allowed to react with agitation at ambient temperatures of about 15–35° C. and at atmospheric pressure, although higher temperatures and pressures may be used. The mixture is allowed to react for 8–24 hours. After the completion of the reaction, the solvent is removed under reduced pressure to produce the product, normally a solid, which may be purified by recrystallization from methyl ethyl ketone.

2-amino-4-chloro-6-alkylamino-s-triazine, used as substrate in this synthetic procedure, may be obtained by methods taught in the prior art, for example, Pearlman and Banks, J. Am. Chem. Soc., 70, 3726–3728 (1948). The various fluoro and chlorofluoroacetones used as substrate are available by methods taught by Cyril Woolf, Kirk-Othmer Encyclopedia of Chemical Technology, second edition, vol. 9, pages 754–767, Interscience Publishers, 1966.

The instant compounds have been found to be unexpectedly effective herbicides in that they are very harmful to plants normally considered undesirable, such as grass and broadleafed weeds, while being harmless toward such plants as corn. 2-chloro-4-ethylamino-6-(2-hydroxy-1,1,1,3,3,3-hexafluoroisopropylamino)-s-triazine is the preferred compound for this purpose.

Normally, the instant compounds will be used as the active ingredient in an herbicidal composition, although they might also be used without a carrier. Various diluents and carriers may be employed and the percent of active ingredients may be varied. Although compositions with less than about .25% by weight of active ingredient may be used, it is preferable to use compositions containing at least about .50% of active ingredient because otherwise the amount of carrier becomes excessively large. Activity increases with the concentration of active ingredient, which may be 10, 50, 95% or even higher.

The amount of composition which is applied for effective herbicidal action is dependent upon considerations such as the type of undesirable plant to be killed, the density of undesirable plants, and soil and climatic conditions. Usually, sufficient composition will be applied to provide about 1–10 pounds of active ingredient per acre.

The instant herbicidal compositions may be in the form of a solution, with the solvent being selected from acetone, methanol and the like. These solutions can be applied to the plants in a direct manner such as by spraying, sprinkling, drenching, etc. Liquid suspensions can also be applied in this manner, with the dispersant selected from liquids such as water and the like.

Application can also be achieved by dusting a powder in which the active ingredient is dispersed. Suitable carriers include finely powdered material such as clay, fuller's earth and talc.

The instant compounds may constitute the sole active ingredient in the herbicidal compositions, but they might be effectively used in combination with other active ingredients, such as other herbicides, insecticides and other plant treating agents.

Inasmuch as the instant compounds are only sparingly soluble in water, it is often convenient to utilize them in the form of their water-soluble salts, for example the hydrochloride salt.

The following examples are provided to more fully illustrate the instant invention. They are provided for illustrative purposes only and are not to be construed as limiting the scope of the instant invention, which is defined by the appended claims.

EXAMPLE I 2-chloro-4-ethylamino-6-(2-hydroxy-1,1,1,3,3,3-hexafluoroisopropylamino)-s-triazine 2-amino-4-chloro-6-ethylamino-s-triazine (20 grams) was mixed in a flask with 500 ml. acetone. Hexafluoroacetone (54 grams) was bubbled into the mixture and the resulting mixture was stirred at about 22–37° C. for 24 hours. The solvent was then evaporated under reduced pressure and the resulting liquid was filtered. A solid product gradually crystallized from the filtrate to afford the desired product, M.P. 152° C.

EXAMPLE II

The procedure of Example I is repeated wherein appropriate alkylaminotriazines and substituted acetones are employed to afford the following products:

2-chloro-4-methylamino-6-(2-hydroxy-1,3-difluorisopropylamino)-s-triazine 2-chloro-4-methylamino-6-(2-hydroxy-1,3-difluoro-1,3-dichloroisopropylamino)-s-triazine 2-chloro-4-ethylamino-6-(2-hydroxy-1,1,3,3-tetrafluoroisopropylamino)-s-triazine 2-chloro-4-methylamino-6-(2-hydroxy-1,1,3,3-tetrafluoro-1,3-dichloroisopropylamino)-s-triazine 2-chloro-4-isopropylamino-6-(2-hydroxy-1,3-difluoro-1,3-dichloroisopropylamino)-s-triazine 2-chloro-4-n-butylamino-6-(2-hydroxy-1,3-difluoroisopropylamino)-s-triazine 2-chloro-4-n-butylamino-6-(2-hydroxy-1,1,3,3,3,-hexafluoroisopropylamino)-s-triazine 2-chloro-4-methylamino-6-(2-hydroxy-1,1,1,3,3,3,-hexafluoroisopropylamino)-s-triazine

EXAMPLE III

Herbicidal activity

The following crop species and weed species were planted in metal flats (12 x 8.5 x 4 inches) in greenhouse potting soil containing one-third mixed clay and sand, one-third mushroom soil, and one-third peat moss. The pH of the soil was 6.8–7.2.

Crop species:
  Corn
  Oats
Weed species:
  Mustard
  Yellow foxtail
  Crabgrass
  Buckwheat
  Morning glory Each flat received a volume of spray equal to 50 gallons per acre of an acetone solution of 2-chloro-4-ethylamino - 6-(2-hydroxy-1,1,1,3,3,3-hexafluoroisopropylamino)-s-triazine. The concentration of the solution was adjusted to provide application of 2, 4 and 10 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within one day after seeding in preemergence tests, and 8–10 days after seeding in the postemergence tests. Results were observed 14 days after spraying.

The effect of the herbicide was evaluated in terms of the injury rating index scale, ranging from 0 to 10 as follows:

0—No apparent injury
1, 2, 3—Slight injury
4, 5, 6—Moderate injury
7, 8, 9—Severe injury (plants will die)
10—Plants were dead An injury rating of 3 is the maximum tolerated for crops and a rating of 7 is the minimum acceptable on weed plants.

| | Injury rating | | | | | |
|---|---|---|---|---|---|---|
| | Preemergence | | | Postemergence | | |
| Plant | A | B | C | A | B | C |
| Corn | 4 | 2 | 1 | 3 | 2 | 2 |
| Oats | 4 | 2 | 1 | 9 | 8 | 6 |
| Mustard | 9 | 8 | 7 | 10 | 10 | 10 |
| Yellow foxtail | 4 | 0 | 0 | 10 | 8 | 3 |
| Crabgrass | 7 | 7 | 7 | 10 | 9 | 9 |
| Buckwheat | 8 | 8 | 8 | 10 | 10 | 8 |
| Morning glory | 10 | 10 | 9 | 10 | 10 | 9 |

A—10 pounds of active ingredient per acre. B—4 pounds of active ingredient per acre. C—2 pounds of active ingredient per acre.

What is claimed is:

1. Herbicidal compositions consisting essentially of 2 - chloro - 4 - ethylamino-6-(2-hydroxy-1,1,1,3,3,3-hexafluoroisopropylamino)-s-triazine as active ingredient and an inert carrier, the concentration of said active ingredient in the composition being 10–95 weight percent.

2. A method of inhibiting growth of undesirable vegetation in corn and oat crops which comprises treating the vegetation with 2-chloro - 4 - ethylamino-6-(2-hydroxy-1,1,1,3,3,3,-hexafluoroisopropylamino)-s-triazine in an amount sufficient to inhibit the growth of the vegetation.

3. A method according to claim 2 wherein the 2-chloro - 4 - ethylamino - 6 - (2-hydroxy-1,1,1,3,3,3-hexafluoroisopropylamino)-s-triazine is applied at the rate of about 2–10 pounds per acre.

References Cited

UNITED STATES PATENTS

| 2,891,855 | 6/1959 | Gysin et al. | 71—93 |
| 3,320,047 | 5/1967 | Gilbert | 71—122 |
| 3,346,576 | 10/1967 | Steinbrunn et al. | 260—249.8 |
| 3,356,485 | 12/1967 | Farah et al. | 71—122 |
| 3,356,715 | 12/1967 | Newallis et al. | |
| 3,388,150 | 6/1968 | Newallis et al. | 71—106 |
| 3,393,993 | 7/1968 | Gilbert et al. | 71—122 |
| 3,394,398 | 7/1968 | Pierpont et al. | 71—122 |
| 3,396,227 | 8/1968 | Gilbert | 71—122 |

LEWIS GOTTS, Primary Examiner

G. HOLLRAH, Assistant Examiner

U.S. Cl. X.R.

260—249.8, 593